United States Patent

[11] 3,573,730

[72] Inventors Douglas R. Andrews;
Allan J. Atrubin, Rochester, Minn.
[21] Appl. No. 866,654
[22] Filed Oct. 15, 1969
[45] Patented Apr. 6, 1971
[73] Assignee International Business Machines Corporation
Armonk, N.Y.

[54] STORED LOGIC RECOGNITION DEVICE
8 Claims, 10 Drawing Figs.

[52] U.S. Cl. .......... 340/146.3, 340/172.5
[51] Int. Cl. .......... G06k 9/06
[50] Field of Search .......... 340/146.3, 172.5, 146.2

[56] References Cited

UNITED STATES PATENTS 3,140,466 7/1964 Greanias et al. .......... 340/146.3
3,384,875 5/1968 Bene et al. .......... 340/146.3X

*Primary Examiner*—Maynard R. Wilbur
*Assistant Examiner*—Leo H. Boudreau
*Attorney*—Sughrue, Rothwell, Mion, Zinn and MacPeak

ABSTRACT: A stored logic character recognition system is disclosed that includes a read-only memory in which is stored a set of functions, the evaluation of which leads to the classification of a given binary pattern. A measurement register performs logical operations on the pattern data to generate a plurality of measurement words. An identification sequence for each character is begun by fetching a predetermined word from the read-only memory to a control-word register. Succeeding words are then fetched to a processor register and decoder where they are interpreted as terms of a logical function. The processor evaluates the logical function against the measurements in the measurement register with the final evaluation of a single logical function resulting in the selection of one of two branch addresses in the control-word register. By an iterative or multilevel type of operation, measurements of the character image are built up until an identification is achieved.

INVENTORS
DOUGLAS R. ANDREWS
ALLAN J. ATRUBIN

BY Hughes, Rothwell, Mion, Zinn & Macpeak
ATTORNEYS

PATENTED APR 6 1971 3,573,730

STORED LOGIC RECOGNITION DEVICE

BACKGROUND OF THE INVENTION

1. Field of the Invention

This invention generally relates to character recognition devices, and more particularly to a stored logic system which stores a logical function of the measurements, evaluates that function against the measurements obtained for the specific character and identifies the character when a function value of 1 is obtained as a particular point in its memory-search cycle.

2. Description of the Prior Art

Character recognition consists first of defining the measurements of the unknown character, then comparing these measurements to previously stored reference measurements of known characters. The known character that best matches the unknown character is accepted as the identity character. An unknown character is typically scanned with a flying-spot scanner, and measurements of the unknown character are collected as it is scanned. The video information is strobed into a shift register, which advances in synchronism with the scanner spot. Thus, the information in the shift register has a direct correspondence with the character information scanned from the document. As the unknown character information enters the shift register, mask circuits look for combinations of bits that define specific measurements. These measurements define certain characteristics or shapes such as a curve, an angular line, an area of white, etc. Although specific measurements might be found in many different characters, each character has a unique combination of measurements. When all inputs to a mask circuit are satisfied, a measurements buffer latch is set. In this way, the measurements of the unknown character are developed as the character is scanned. When the character has been completely scanned, measurements of known characters are then compared a character at a time.

The manner in which the measurements of the reference characters are compared with the measurements of the unknown character vary. In one known system, the reference words are stored in two classes of tables: First-level tables contain averaged measurements for each character or class of characters in a set. These measurements represent the most typical measurements regardless of font. Second-level tables consist of many subtables. Each subtable contains a reference word of a single character in several different fonts. The reference tables are further separated into areas. Each area may contain only upper case alpha, upper-lower case alpha, or numeric characters. During comparison or correlation, each reference word is compared to the measurements register. The number of mismatches are counted, and reference words with low numbers of mismatches are remembered as candidates for character identification. When all reference words have been compared to the measurements register, the candidates are examined to determine character identification. Candidates for identification are stored in a decision table. The candidates are stored in order of mismatched count, with the character having the lowest mismatched count first. Reference words resulting in a mismatched count greater than a predetermined correlation cutoff are rejected as identity candidates and are not stored in the decision table.

While the foregoing type of character recognition system has been satisfactory in the past, some difficulty has been encountered in defining the measurement combinations which define each character due to the inherent inflexibility of the system. Greater flexibility can be achieved by employing a stored-logic scheme on a dedicated or time-shared general purpose CPU. In stored logic computation, the computer system logic is defined entirely in terms of stored logic codes which specify logical functions, such as AND, OR, transfer, and the like. The difficulty with this approach, however, is the cost and slowness which results when implemented on a general-purpose CPU.

SUMMARY OF THE INVENTION

It is therefore a principal object of the present invention to provide a character recognition system which combines the flexibility of stored-logic CPU recognition with the speed of the hard-wired approaches.

It is a further object of the instant invention to provide such a character recognition system which realizes a savings in total dedicated hardware over either approach.

According to the present invention, the foregoing and other objects are obtained by novel processor hardware which directly implements the stored-logic approach to character recognition. The invention comprises a read-only memory in which is stored a set of functions, the evaluation of which leads to the classification of a given binary pattern. The fundamental function to be considered is a special threshold function from which are constructed the recognition or classification functions. Briefly, the recognition functions are formed by the products of sums of the threshold functions.

An understanding of the stored-logic approach to computation may be had by reference to U.S. Pat. No. 3,246,303, issued on Apr. 12, 1966, to Lowell D. Amdahl et al. for "Stored Logic Computer." As described therein, the computer system logic is defined entirely in terms of stored logic code signals and the signal from temporary storage device such as a flip-flop or circulating register. The stored logic code signals specify logical functions such as AND, OR, transfer, and the like. The computer comprises a storage device for producing a predetermined sequence of the signal sets, one set being produced during each time interval, corresponding to the stored logic code. A storage device is employed to receive input digits which represent a quantity to be operated upon. The computing logic is then mechanized as a function of the signals produced by the storage device and the signal sets defining the stored logic code.

The applicants have adapted this basic concept to the character recognition problem. According to the applicants' invention, the input to the system is obtained from a CRT flying-spot scanner and clocked shift-register. A measurement register performs logical operations by means of mask circuits to generate a plurality of measurement words. An identification sequence for each character is begun by fetching a predetermined word from the read-only memory to a control-word register. Succeeding words are then fetched to a processor register and decoder where they are interpreted as terms of a logical function. The processor evaluates the logical function against the measurements in the measurement register with the final evaluation of a single logical function resulting in a branch instruction to the instruction counter. According to one feature of the invention, the satisfaction or nonsatisfaction of a logical function may be considered as another measurement of the shift-register pattern resulting in the storing in one of several latches reserved for the purpose in the measurement register of the logical value of the evaluation of the function. This feature permits an iterative or multilevel type of operation whereby increasingly complex measurements of the character image are built up until an identification is achieved. It also allows a considerable increase in speed, since identical portions of a number of functions need be evaluated only once. When a function is reached which is sufficient to identify the image as being the character specified in its control-word, an identifying code is transferred to an ID register for outputting.

DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
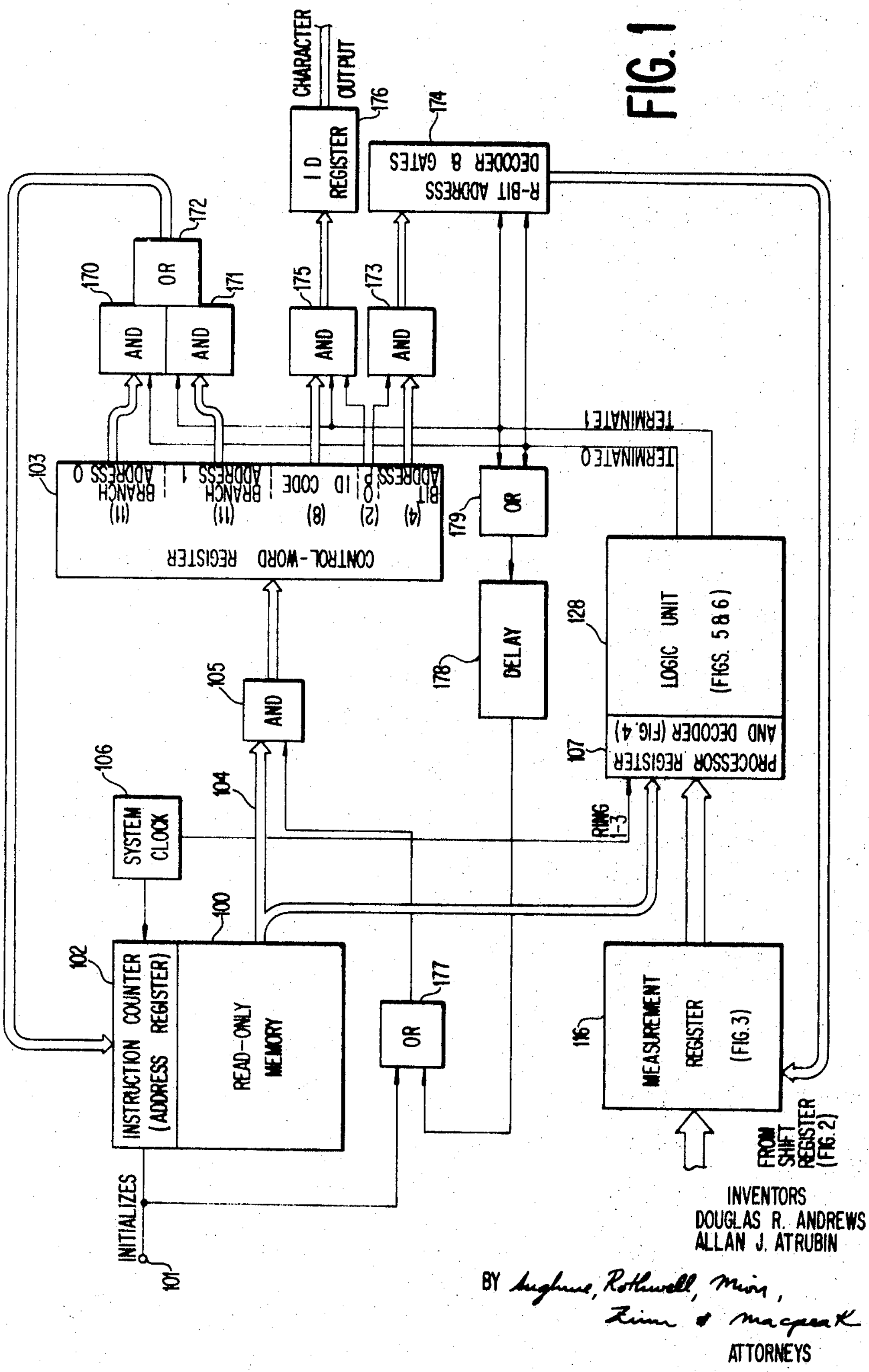
FIG. 1 is a block diagram illustrating the novel processor according to the invention.
Figure 2A:
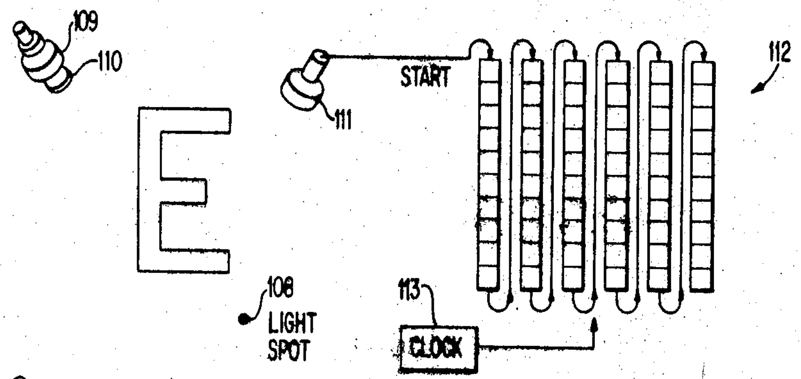
FIG. 2A to 2E diagrammatically illustrate the manner in which the system input is obtained.
Figure 2B:
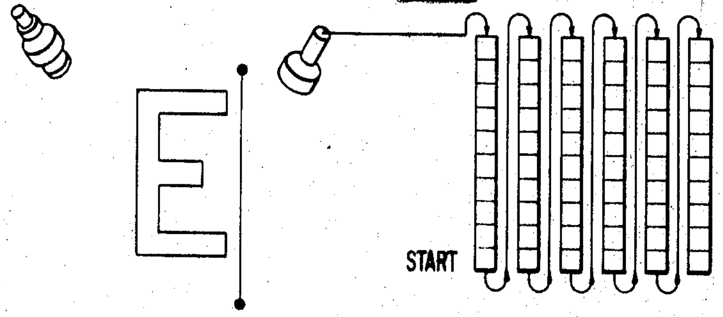
Figure 2C:
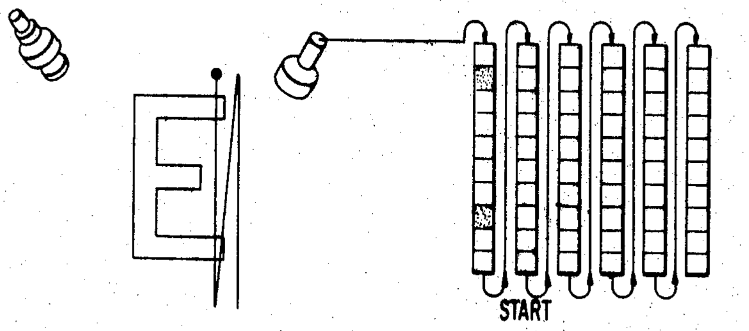
Figure 2D:
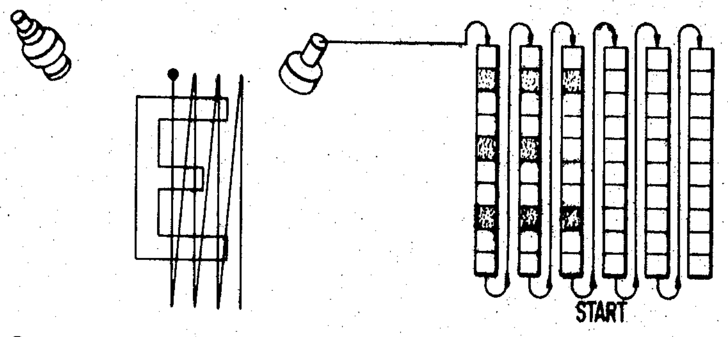
Figure 2E:
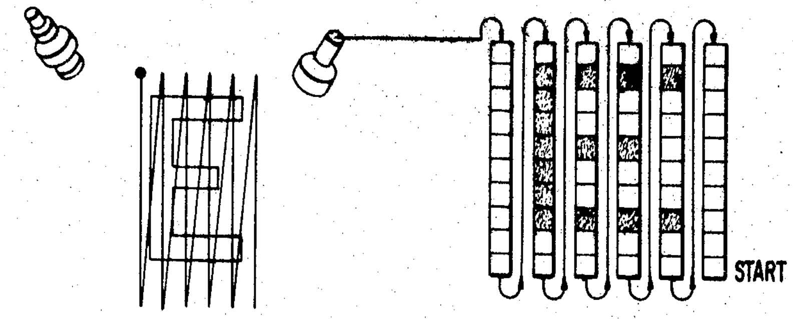

Referring now to the drawings wherein like reference numerals designate identical or corresponding parts throughout the several views, and more particularly to FIG. 1, the processor includes a read-only memory 100 which stores a plurality of binary words. In the specific example given, each word comprises 36 bits. Two types of words are stored in the memory 100, a control word and a measurement word, but these are indistinguishable when stored in the memory. An "initialize" pulse at terminal 101 begins an identification sequence by resetting the instruction counter 102 to fetch a predetermined 36-bit word from the memory 100 to a control-word register 103. This is accomplished by gating the data output from memory 100 on line 104 with the initialize pulse in AND gate 105. It will be appreciated that AND gate 105 is in fact 36 AND gates having their outputs connected to respective latches in the control-word register 103. The system clock 106 then advances the instruction counter 102 to fetch succeeding words to a processor register and decoder 107.

The input to the system is obtained from a CRT flying-spot scanner and a clocked shift-register. Reference is made to FIGS. 2A through 2E which illustrate the manner in which a character to be identified is scanned. A light spot 108 is generated by a CRT 109 and its associated lens system 110. Light spot 108 is scanned vertically upward and indexed horizontally to produce a raster which completely scans the character to be identified. Each time the light spot 108 traverses a portion of the character, detector 111, which may be for example a photomultiplier tube, produces an output pulse which is fed to a shift-register 112. The electron beam of the CRT 109 is blanked during each retrace so that video enters the shift-register 112 only during the upward sweeps of the light spot 108. For purposes of illustration, the shift-register 112 is reduced in size to only 60 stages. In practice, the shift-register 112 would be a 657-position shift-register. The video information from detector 111 is strobed into the shift-register 112 by a clock 113 which is synchronized with the scanner spot 108. As depicted by the shading, the information in the shift-register 112 has a direct correspondence to the character information scanned from the document.

As the unknown character information enters the shift register 112, mask circuits look for combinations of bits that define specific measurements. This is illustrated, for example, in FIG. 3 of the drawings wherein the 657 output lines from shift-register 112 are connected to mask or logic circuits 114. In practice, logic circuits 114 may comprise 240 multiple-input AND gates which are wired to certain predetermined stages of shift-register 112. Each AND gate recognizes a certain characteristic or shape such as a curve, an angular line, an area of white, or other predetermined patterns. The outputs of logic circuits 114 are used to set a like number of measurement latches 115. The specific measurements made by logic circuits 114 may be found in many different characters. Logic circuits 114 and measurement latches 115 comprise the measurement register 116 shown generally in FIG. 1 of the drawings.

Figure 4:
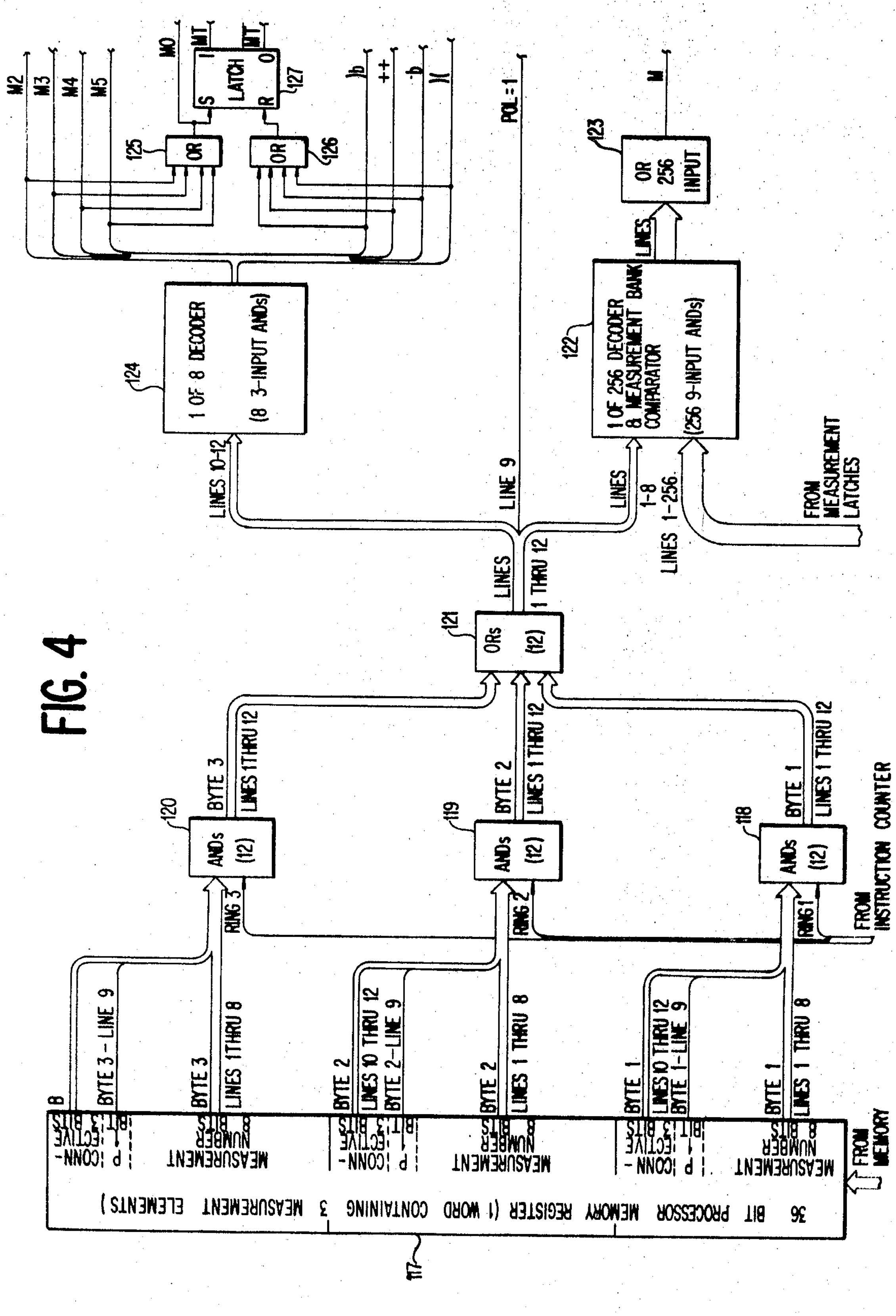
FIG. 4 is a block diagram illustrating the processor register and decoder employed in the system of FIG. 1.

Referring now to FIG. 4, the processor register and decoder 107 comprises a 36-bit processor memory register 117 which is arbitrarily divided into three bytes. Each byte is composed of 12 bits including a measurement number of eight bits, a truth value of one bit, and a functional connective of three bits. The functional connectives are of two types: threshold functions and logical operations. Since there are three bits, there are eight possible functional connectives. These are listed below:

1. Threshold Specifications
   - *b*=*N* of *N* required
   - *M2*=2 of *N*
   - *M3*=3 of *N*
   - *M4*=4 of *N*
   - *M5*=5 of *N*
2. Logical Operations
   - ++–indicates inner sum
   - ) ( –indicates outer product
   - )*b* –indicates end of recognition function The three bytes of each measurement word are decoded in accordance with the "ring 1—3" clock input from the system clock 106. Thus, each byte is successively gated out of register 117 by AND gates 118, 119 and 120 during successive machine cycles. It should be noted here that each of AND gates 118, 119 and 120 is in fact 12 AND gates each connected to a respective latch of a corresponding byte in the memory register 117. Thus, the output of AND gate 118 is 12 lines representing byte 1 of the measurement word and is connected as one input of 12 three input OR gates 121. Lines 1 through 8 of OR gates 121 representing the eight-bit measurement number are connected to a decoder 122**.

The output of measurement register 116 comprises 256 lines composed of 240 lines from the measurement latches and 16 lines from R-bit latches to be described hereinafter. These 256 lines are connected to the decoder 122. The eight-bit measurement number defines a unique code corresponding to one of 256 latches in the measurement register 116. Decoder 122 may, for example, be constructed of 256 nine-input AND gates. Each of these AND gates would be connected to a respective one of the 256 latches in the measurement register 116. The other eight inputs to each AND gate would be connected to the eight lines carrying the measurement number. Thus, decoder 122 operates to select a single latch in the measurement register 116 for comparison with a specified truth value. The 256 outputs from decoder 122 are combined in a single 256-input OR gate 123 the output of which represents the selected measurement value.

The specified truth value which may be a 1 or a 0 is supplied on line 9 from the OR gates 121, while the remaining three lines are connected to a decoder 124. Decoder 124 may typically comprise eight three-input AND gates which serve to identify the specific functional connective associated with a particular measurement number and truth value. Thus, each byte of a measurement word constructs one term of the logical function by providing one logical variable (i.e., the measurement number), the truth value of that measurement as against a specified truth value (*POL*), and a functional connective which follows the variable. As previously stated, the use of three bytes per word is arbitrary; in fact, one model of the present invention has been constructed which uses a 60-bit word of five bytes. In addition, a single logical function may span any number of bytes or words.

Besides generating as outputs the specific measurement *M*, its associated truth value *POL*, and one of eight possible functional connectives as set forth above, processor register and decoder 107 also generates three additional logical outputs. These are obtained by combining the functional connectives *M2* through *M5* in OR gate 125 and the remaining functional connectives in OR gate 126. The output of OR gate 125 operates to set a latch 127, while the output of OR gate 126 operates to reset the latch 127. Latch 127 provides outputs *MT* corresponding to its set position and *MT* corresponding to its reset position. In addition, an output *MO* is obtained from OR gate 125.

The outputs of processor register and decoder 107 are connected to a logic unit 128 which operates to evaluate the stored set of functions which ultimately leads to the classification of the measured binary pattern. The fundamental function to be considered in this evaluation is a special threshold function $T_{\tau,N}$. This threshold function is defined as follows:

$$T_{\tau,N}X_i i=1,\ N=1 \text{ if at least } \tau \text{ of the } N \text{ specified binary variables } X_i \text{ are in the specified state,}$$
$$=0 \text{ otherwise.}$$

The recognition or classification functions are constructed from the fundamental threshold functions in the following form:

$$R(X)=\cap(\cup(T\{X_i\}))$$

Simply stated, the recognition functions are the products of sums of the threshold functions.

Figure 5:
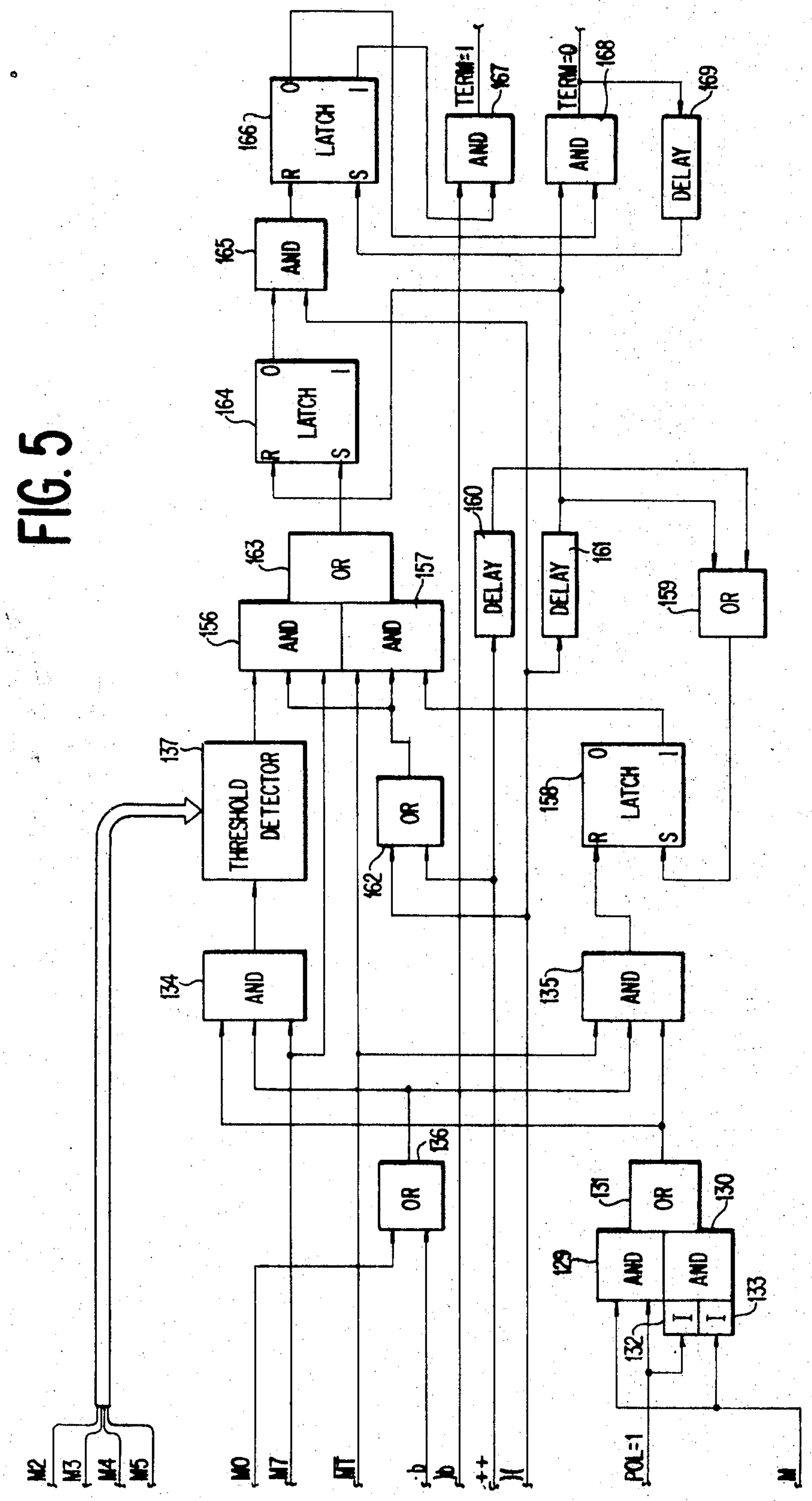
FIG. 5 is a block and logical diagram of the logic unit used in the system shown in FIG. 1.

FIG. 5 of the drawings illustrates the basic arrangement of the logic unit 128. The measurement value *M* is compared with its associated truth value *POL* in a comparison circuit comprising AND gates 129 and 130 and an OR gate 131. As illustrated, the measurement value *M* and the truth value *POL* are directly connected to AND gate 129 and through respective inverters 132 and 133 to AND gate 130. Thus, OR gate 131 WILL provide a one output if both the measurement value *M* and the truth value *POL* are both 1's or both O's but not otherwise.

The output of OR gate 131 is connected to AND gates 134 and 135. AND gate 134 has a second input connected to the *MT* output of latch 127, while AND gate 135 has a second input connected to the $\overline{MT}$ output of latch 127. Thus, latch 127 serves to determine whether a threshold function or other logical function is to be performed depending on the functional connective associated with a particular measurement number. In addition, AND gates 134 and 135 both receive as inputs the output of an OR gate 136. OR gate 136 receives as inputs the *MO* output from OR gate 125 and the *.b* connective from decoder 124.

Figures 3, 6:
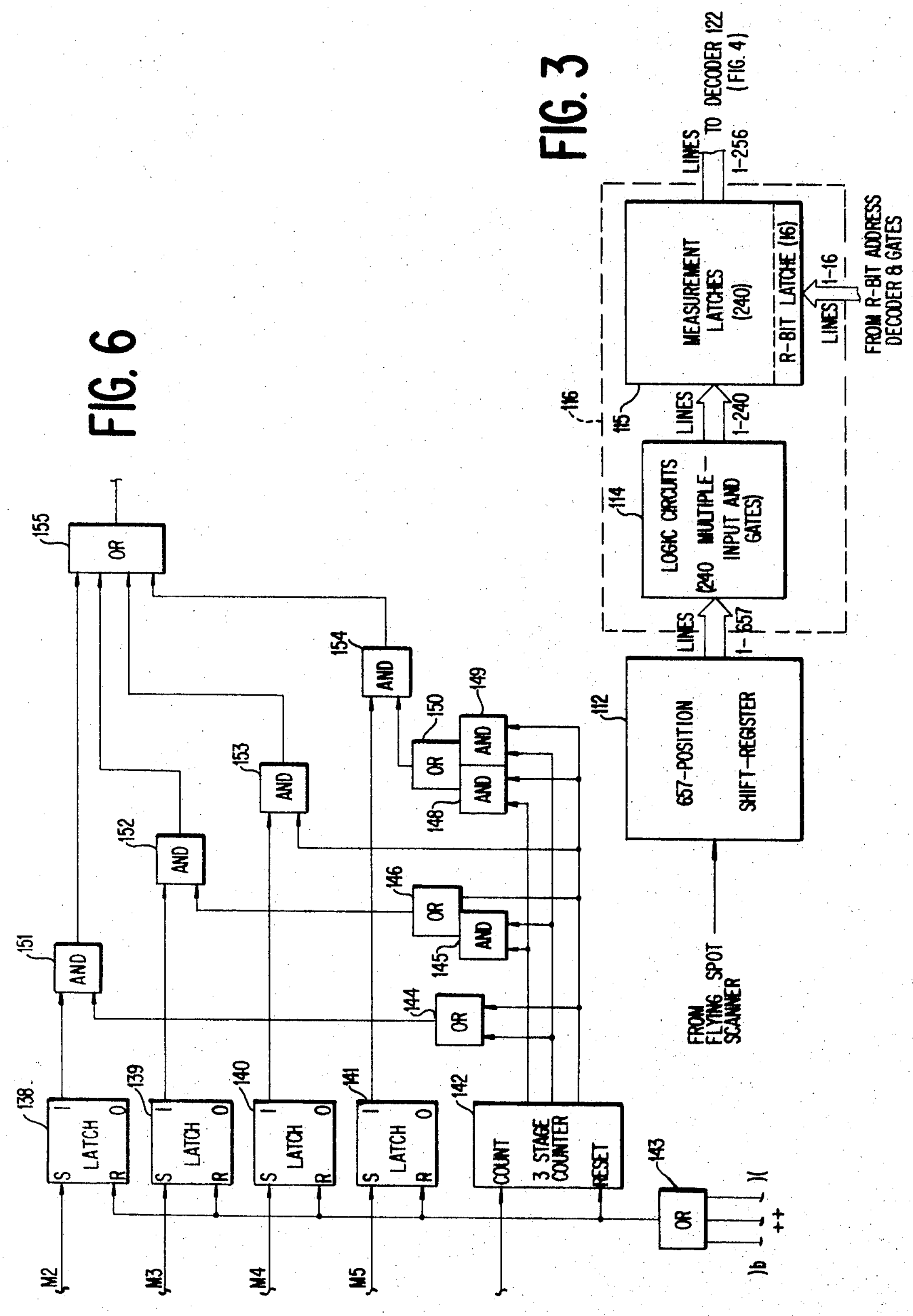
FIG. 3 is a block diagram of the measurement register shown in the system of FIG. 1 with its input connection to the clocked shift-register of FIG. 2.
FIG. 6 is a logical diagram of the threshold detector employed in the logic unit shown in FIG. 5.

The output of AND gate 134 is connected to threshold detector 137 which is shown in greater detail in FIG. 6. As shown therein, the threshold detector 137 comprises four latches 138, 139, 140, and 141, each of which receives a respective functional connective *M2* through *M5* from the decoder 124. The threshold circuit also includes a three-stage counter 142 which receives as its input the output of AND gate 134. It should be noted at this point that the *.b* connective is used as the connective portion of each byte of the threshold function, but the *M2* to *M5* connectives may also be employed. OR gate 143 which receives as inputs the connectives *)b*, ++, and ) ( then provides an output which resets the threshold function when any other connective appears.

The three-stage counter 142 has three outputs *S1*, *S2* and *S4* which are decoded by logical networks to provide four outputs indicative of the count attained by the counter 142. Thus, OR gate 144 which is connected to the *S2* and *S4* outputs of counter 142 will provide an output when the counter has a count of at least two. AND gate 145 is connected to the *S1* and *S2* outputs of counter 142 and, therefore, will provide an output when the counter has attained a count of three. The output of AND gate 145 is combined with the *S4* output of counter 142 in an OR gate 146. Thus, the OR gate 146 will provide an output whenever the counter 142 has attained a count of at least three. A third output on line 147 is taken from the *S4* output of the counter and provides an output whenever the counter has attained a count of at least four. The fourth output is obtained from the remaining logic which comprises AND gate 148 connected to the *S1* and *S4* outputs of counter 142 and AND gate 149 connected to the *S2* and *S4* outputs of the counter. The outputs of AND gates 148 and 149 are combined in an OR gate 150 thus providing an output whenever the count in counter 142 is at least five.

A specific decoded output from the three-stage counter 142 is selected by one of AND gates 151 through 154 which are enabled by a corresponding one of the latches 138 through 141. For example, if the functional connective *M3* corresponding to a threshold specification of three of *N* is decoded by decoder 124, the latch 139 will be set thereby enabling AND gate 152. If the three-stage counter 142 attains a count of three or greater an output will be produced at OR gate 146 which will be passed by AND gate 152 to an OR gate 155. To summarize, if the functional connective which is decoded is one of the threshold specifications *M2* through *M5*, a corresponding one of the AND gates 151 through 154 will be enabled. If the threshold specification is satisfied, an output will be passed by the corresponding AND gate to the OR gate 155.

Referring again to FIG. 5 of the drawings, the output of OR gate 155 is connected as one input to AND gate 156. AND gate 156 is enabled by the *MT* output of latch 127.

A corresponding AND gate 157 which is enabled by the $\overline{MT}$ output of latch 127 receives as its input the output of a latch 158. Latch 158 is set by the output of an OR gate 159. OR gate 159 receives as its inputs the decoded connectives ++ and )( from decoder 124 through suitable delay devices 160 and 161, respectively, which provide a time delay sufficient to allow settling of transients. Latch 158 is reset by the output of AND gate 135.

Both of the AND gates 156 and 157 receive as inputs the output of an OR gate 162. OR gate 162 has its inputs directly connected to the functional connective outputs ++ AND )( of decoder 124. The outputs of AND gates 156 and 157 are combined in an OR gate 163. The output of OR gate 163 operates to set a latch 164. Latch 164 is reset by the output of the delay device 161. When reset, latch 164 enables an AND gate 165 which has its second input connected directly to the functional connective output )( of decoder 124. The output of AND gate 165 resets a latch 166, the outputs of which are used to generate Terminate outputs. This is accomplished by AND gates 167 and 168 wherein AND gate 167 is connected to the true output of latch 166, and AND gate 168 is connected to the complementary output of latch 166. The second input to AND gate 167 is connected directly to the *)b* connective output from decoder 124. The output of AND gate 167 is identified as the Terminate = 1 output. AND gate 168 has its second input connected to the delay device 161. It will be recalled that the input to the delay device 161 was the )( functional connective output of the decoder 124. The output of AND gate 168 is identified as the Terminate = 0 and is used to set the latch 166 through a suitable delay device 169.

The final evaluation of a single logic function is expressed by the Terminate outputs of AND gates 167 and 168. The Terminate=1 occurs when the current value is 1 and a *)b* connective occurs. The Terminate= occurs when the current value is 0 at the end of any outer product, )(, since the function can never thereafter be satisfied. Note that each expression has three logical sublevels; however, this number is not material.

Referring now to FIG. 1 of the drawings, the control-word register 103 comprises 36 bits which may be divided as follows: 11 bits each for two branch addresses, eight bits for an ID code, two bits for an OP code, and four bits for an R-bit address. Each 11-bit branch address is connected to a respective one of AND gates 170 and 171. Obviously, each of AND gates 170 and 171 are in fact 11 AND gates, each connected to a corresponding bit-position in the control-word register corresponding to the respective branch addresses. The Terminate=0 output from logic unit 128 is connected to the enable input of AND gate 170, while the Terminate=1 output is connected to the enable input of AND gate 171. The outputs of AND gates 170 and 171 are combined by 11 two-input OR gates 172. Thus, the Terminate outputs from the logic unit 128 select one of the two 11-bit branch addresses in the control-word register, depending upon the final value of the expression just completed. The instruction counter 102 then moves to the selected address and begins to evaluate a new logic function, the first word of which is another control word containing two branch addresses. In the most basic form of the character recognition system according to the invention, the first logical function to be satisfied would cause the shift-register pattern to be recognized as one and only one character, whose name would appear in the "ID code" section of the control word. The branch address selected would then be a special "memory-search end" address which would stop the cycling of the instruction counter until another "initialize" pulse is received.

The specific embodiment shown, however, permits more complicated functions to be used for character recognition. Specifically, the satisfaction or nonsatisfaction of an expression may be considered to be yet another "measurement" of the shift register pattern. In order to perform this operation, one bit of the two-bit OP code in the control word enables the AND gate 173 which transmits the four-bit "R-bit address" in the control word to a decoder and a set of AND gates 174. This causes the logical value of the Terminate outputs to be stored in one of 16 R-bit latches reserved for this purpose in the measurement register 116. Thereafter, the processor continues to evaluate further expressions, and may access the value of the stored function just as though it were yet another measurement from the shift-register. This feature permits an interative or multilevel type of operation whereby increasingly complex measurements of the character image are built up until an identification is achieved. It also allows a considerable increase in speed of operation since identical portions of a number of functions need be evaluated only once.

The final character identification is then achieved by the eight-bit ID code in the control word and the other bit of the OP code. Thus, when a function is reached which, if satisfied, will be sufficient to identify the image as being the character specified in its control word, the second OP code bit and the Terminate=1 output from logic unit 128 enable AND gate 175 which transmits the ID code field to the ID register 176 for outputting. As before, the branch address 1 for this word is a special location denoting memory-search end. Although not shown in this embodiment, other OP code values could be used for determining recognition conflicts and errors, for causing a rescan of the character, etc.

It should now be appreciated that the present invention operates to continuously cycle in a memory-search mode to construct logical functions of the measurements from stored measurement numbers and logical connectives, each time evaluating the logical functions against the measurements obtained for the specific character in the shift-register. The evaluation of each logical function is begun by first reading a predetermined control word into the control-word register 103 and thereafter reading successive measurement words to the processor register 107 for evaluation by logic unit 128. This continues until the Terminate outputs select one of the branch addresses and the control-word register thereby causing the cycle to repeat by beginning the evaluation of a new logical function. It takes many such cycles before a character can be identified. Thus, most control words will not be associated wit with functions which are sufficient to identify a specific character. As a result the ID code of these control words will be a dummy word, and the second bit of the OP code will inhibit AND gate 175. The first bit of the OP code may or may not enable the AND gate 173 depending upon the nature of the function being evaluated. When a branch address is selected from the control-word register 103, the e next control word is gated into the register by AND gate 105 which this time receives the output of OR gate 177. OR gate 177 receives as its inputs the initialize pulse from terminal 101 which, it will be recalled, began the identification sequence and also the output from a delay device 178. The delay device 178 receives as its input the output of OR gate 179 having as its inputs the Terminate outputs of logic unit 128.

Thus, the present invention provides recognition hardware which combines the flexibility of stored-logic CPU recognition with the speed of the hard-wired approach. Specifically, the logic-function approach of the invention allows a much greater freedom in defining the measurement combination which define each character. The storage of the logic functions in the read-only memory eliminates the excessive cost and difficult modification methods which would result if the functions were to be hard-wired. It will be apparent, however, that the embodiment shown is only exemplary and that various modifications can be made in construction and arrangement.

We claim:

1. A stored logic character recognition system comprising:
a. scanning means for scanning a character to be identified and providing a plurality of measurement outputs representative of certain characteristics of patterns of said character;
b. a read-only memory in which is stored a set of functions;
c. a control-word register for temporarily storing a control word having at least two branch addresses;
d. a processor register and decoder for temporarily storing a measurement number which defines one term of a logical function, said term selecting one of said plurality of measurement outputs form said scanning means and also defining the truth value of said selected one of said plurality of measurement and a logical connective;
e. sequencing means for reading a predetermined word from said read-only memory into said control-word register and thereafter reading succeeding words from said read-only memory into said processor register and decoder; and
f. means for evaluating said function against the measurements obtained by said scanning means and identifying said character when a match is obtained, said evaluation means further producing outputs which select one of said branch addresses so as to cause a new control word to be read into said control-word register each time a single logic function has been evaluated.

2. A stored logic character recognition system as defined in claim 1 wherein said evaluating means comprises:
a. means for comparing a selected one of said measurement outputs with its defined truth value for a given logical function;
b. variable thresholding means responsive to logical connectives stored in said processor register and decoder for receiving the output of said comparing means and producing an output if a given number determined by the logical connectives of the measurement outputs compare with their corresponding truth value; and
c. means receiving the outputs of said variable threshold means and responsive to logical connectives stored in said processor register and decoder for generating the logical products of the sums of the threshold functions.

3. A stored logic character recognition system as defined in claim 2 wherein said variable threshold means comprises:
a. a plurality of latches set in accordance with the threshold specification as defined by the logical connective stored in said processor register and decoder;
b. counting means connected to said comparing means for counting the number of measurement outputs which compare with their corresponding truth value; and
c. logic means enabled by said plurality of latches to provide an output if said counting means attains at least a count determined by the logical connectives.

4. A stored logic character recognition system as defined in claim 2 wherein said evaluation means produces a Terminate = 1 output if the current value of the logical function being evaluated is a 1 and a logical connective indicating end of recognition function occurs and a Terminate = 0 output whenever the current value of the logical function is a 0 at the end of any logical product, said system further comprising:
a. first selecting means responsive to said Terminate 1 output for selecting one of said two branch addresses in said control-word register;
b. second selecting means responsive to said Terminate=0 output for selecting the other of said two branch addresses in said control-word register; and
c. gating means responsive to both of said terminate outputs for gating a new control word into said control-word register from said read-only memory.

5. A stored logic character recognition system as defined in claim 4 wherein said control-word register additionally stores an ID code which identifies a specific character, said system further comprising output gating means responsive to said Terminate=1 output for transmitting the ID code when a logical function is reached which, if satisfied, is sufficient to identify the character scanned as the character specified in the control word.

6. A stored logic character recognition system as defined in claim 5 wherein said scanning means includes a measurement register for storing said plurality of measurement outputs, said measurement register having a plurality of additional latches for storing said Terminate outputs as additional measurements outputs, said system further comprising means responsive to an address stored in said control-word register for transmitting said Terminate outputs to a selected one of said additional latches whereby an iterative operation may be performed to permit increasingly complex measurements of the scanned character to be built up until identification is achieved.

7. A stored-logic Boolean-function evaluating system, comprising:

a. means for receiving a set of individually named input variables, each of said variables having one of two possible truth values;

b. memory means for storing a plurality of addressable words, and for accessing said words in a predetermined sequence beginning with a specified address;

c. a control register coupled to said memory means for storing a first set of accessed ones of said words, and for decoding each word of said first set into a plurality of branch addresses;

d. a processor register coupled to said memory means for storing a second set of accessed ones of said words, and for decoding each word of said second set into a name of one of said input variables and a connective associated with said one variable;

e. evaluating means coupled to said processor register and to said receiving means for performing upon the input variables corresponding to said name series of operations specified by said connectives, so as to produce a series of output signals having one of two possible truth values, said evaluating means further being responsive to at least one of said connectives for emitting the current truth value of said series of output signals; and f. means coupled to said evaluating means and to said control register for supplying one of said stored branch address to said memory means as said specified address in response to said emitted output signal, said one branch address being selected from said plurality of branch addresses by said current truth value.

8. A Boolean-function evaluating system as defined in claim 7, wherein said processor register is further adapted to decode each word of said second set into a desired truth value associated with said one variable; and wherein said evaluating means is adapted to compare said desired truth value with the actual truth value of a corresponding one of said input variables in producing the truth value of each signal of said series of output signals.